Patented Sept. 25, 1923.  BEST AVAILABLE COPY  1,468,882

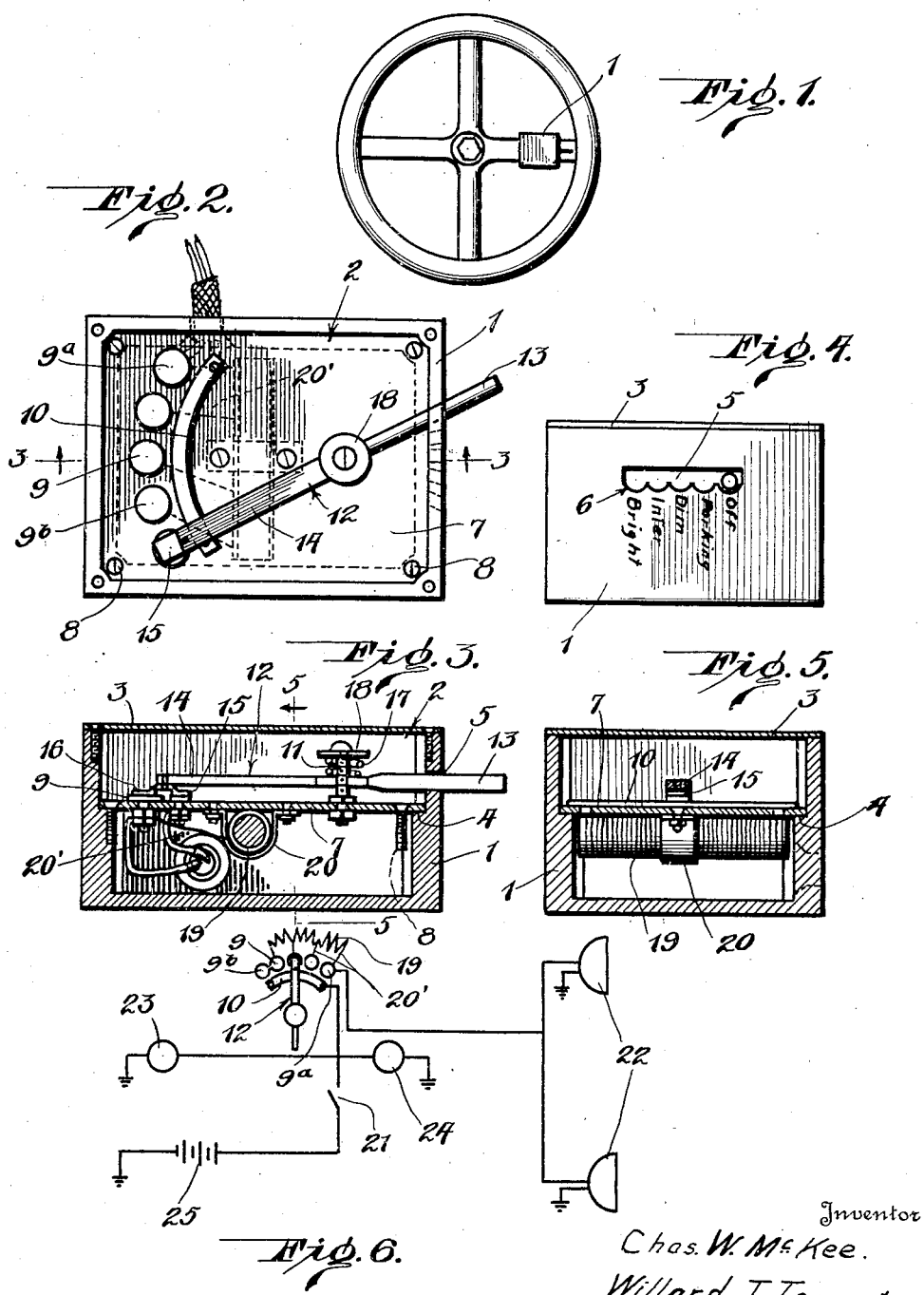

UNITED STATES PATENT OFFICE.

CHARLES W. McKEE, OF HARRISBURG, AND WILLARD T. TAGGART, OF MARIETTA, PENNSYLVANIA.

DIMMING SWITCH FOR AUTOMOBILE LIGHTS.

Application filed November 18, 1922. Serial No. 601,886.

*To all whom it may concern:*

Be it known that we, CHARLES W. MCKEE and WILLARD T. TAGGART, citizens of the United States of America, residing at Harrisburg and Marietta, respectively, in the counties of Dauphin and Lancaster, respectively, and State of Pennsylvania, have invented certain new and useful Improvements in Dimming Switches for Automobile Lights, of which the following is a specification.

This invention relates to dimming switches for automobile lights particularly adapted for mounting within easy reach of the driver of the vehicle.

The invention comprehends the provision of a switch mechanism mounted on the steering wheel of a motor vehicle and connected in the lighting circuit thereof for controlling and varying the lights from full brightness through a plurality of intermediate dimming positions, to the "off" position.

The invention further comprehends the provision of a switch structure having the various steps so co-related that the lights are never extinguished between steps, but only in the "off" position, so as to guard against the accidental cutting off of the lights in positioning the switch in one of the intermediate positions. In this connection, the switch is provided with a dimming step for cutting the lights to a low brilliancy to provide sufficient light for parking and yet not put an injurious load on the battery.

The invention also provides for a novel structure of switch in which the main body or housing is molded from insulating material having a plate removably secured within the body carrying all of the component parts of the switch proper, while a cover plate removably secured to the body provides access for removing the first mentioned plate and its parts.

The invention includes the provision of a novel switch lever and contact assemblage, in which the switch lever or arm is pivotally mounted on a pin carried by the plate, and is fulcrumed at one end while the other end carries a contact brush which is forced against the contact points to make a good connection and for keeping the points clean by being axially movable on its pivot and provided with a spring for pushing the lever into engagement with contacts on the plate.

The invention includes other features which are pointed out in the following description and claims.

In the drawings:

Fig. 1 is a plan of a steering wheel having the invention applied thereto.

Fig. 2 is a plan view of the switch with the cover plate removed.

Fig. 3 is a sectional view taken on line 3—3 of Fig. 2.

Fig. 4 is an end view of the switch, showing the various positions for adjustment of the switch lever.

Fig. 5 is a sectional view on line 5—5 of Fig. 3.

Fig. 6 is a wiring diagram showing the circuit connections with the lighting circuit of a vehicle.

The main body or housing 1 is molded from insulating material with the top side open as indicated at 2, adapted to have a cover 3 removably secured thereto, and provided interiorly with a shoulder 4 extending entirely around the inside of the body. Above the shoulder 4 one end wall of the body is provided with an opening 5 having a plurality of notches in the lower edge indicated at 6 for a purpose to be described.

A plate 7 is removably secured within the body by any suitable means, such as indicated at 8, and is provided on its upper face with a plurality of contact points 9 slightly spaced from each other and from an arcuate contact 10, and arranged in concentric relation to a pivot pin 11 secured to the plate. A switch lever 12 is pivotally mounted on pin 11 and axially movable thereon, having an arm 13 projecting through the opening 5 and cooperating with the notches 6 and an arm 14 provided with a contact brush 15, having feet 16 bridging and contacting with the arcuate contact 10 and contact points 9, so that the brush will overlie one or two of the contacts 9 and the contact 10 for closing circuits hereafter described. The switch lever is fulcrumed in the opening 5 and brush 15 forced into firm engagement with the contacts by the action of a coil spring 17 around pin 11 and normally held under compression thereon between washer 18 and the switch lever. The pivot pin is adjustable in an obvious manner for adjusting the degree of compression of the coil spring.

A resistance element 19 is mounted in brackets 20 secured to the bottom of the plate 7 and provided with a plurality of taps 20' at intervals in the winding, one tap being connected to each contact point except the end point at 9$^b$. The lighting circuit of an automobile on the side containing the usual dash switch 21, is broken adjacent the switch and the ends attached to the arcuate contact 10 and the contact 9$^a$ respectively, as shown in Figs. 2 and 6.

In the wiring diagram in Fig. 6, the complete lighting circuit is shown with the above described invention properly associated therewith, the head lamps being indicated at 22, the tail light 23 and a dash lamp 24. The battery 25 supplies the current for the lamps, which is controlled by the improved dimming switch, the lights receiving the full current of the battery when the switch lever 12 bridges the end contact 9$^a$ and contact 10, as shown in Fig. 6, while the current supply is diminished successively as the switch lever is moved toward the other end contact, a portion of the resistance 19 being interposed in the circuit as the lever is moved successively to each contact away from contact 9$^a$. During the movement of the switch lever, the foot 16 engaging the contacts 9 is always in engagement with the contacts, the foot being wide enough to bridge the space between the contacts, so that the lights are never out when the switch lever is moved from one position to the next, but only when the lever is placed in the notch indicating the "off" position, at which time the brush 15 contacts with the end contact 9$^b$ having no circuit connection.

The end of the body 1 is provided with legends indicated in Fig. 4, denoting the positions of the switch lever in the notches for various degrees of illumination of the lamps.

The position of the switch when set for "parking" throws the whole resistance element in circuit for dimming the lights below the necessary running brightness, so that while they provide sufficient light for a car at a standstill, yet the current consumption is not great enough to drain the battery when left in this position a considerable length of time.

By the provision of a plurality of successive steps for dimming the lights merging into one another, due to the brush overlapping two contacts, the lights may be gradually dimmed for an approaching machine on the road, so that the eyes of the driver of said machine may become accustomed to the reduced light without having the blinding effect usually resulting in cutting the lights down in one step. This is an important advantage gained by the use of the present invention over similar devices now in use.

The switch is conveniently mounted on one of the radial arms of the steering wheel in any suitable manner, as clearly shown in Fig. 1, so that the driver of the vehicle may operate the switch without removing his hand from the wheel.

What we claim is:

1. A dimming switch for automobile lights, comprising a casing, a plate removably secured in said casing, a resistance element mounted on the plate, and a contact mechanism carried by the plate having a plurality of connections with said resistance element and interposed in the lighting circuit of an automobile for controlling the brilliancy of the lights through interposing predetermined portions of said resistance element in said circuit.

2. A dimming switch for automobile lights, comprising a casing, a plate removably secured therein, a resistance element mounted on the plate, an arcuate contact mounted on the plate, a plurality of contact points mounted on the plate in spaced relation with each other and the arcuate contact, a pivot axially adjustable in the plate, a switch lever pivotally mounted on said pivot having a brush on one end contacting with the arcuate contact and one or more of said contact points and having the other end extending through an opening in the casing provided with notches corresponding to the contact points and adapted for cooperation therewith, a plurality of taps at intervals in said resistance connected with respective contact points, and resilient means on the pivot engaging the lever for forcing the brush into engagement with said contacts, the lever being fulcrumed in the opening in the casing, whereby when the switch is connected in a lighting circuit the switch arm may be operated to place predetermined portions of said resistance in the circuit for varying the brilliancy of the lights.

3. In a dimming switch, the combination of a support having contacts thereon, a switch member pivotally mounted at one point and fulcrumed at another on said support, and means for moving said member on the fulcrum adapted to hold the same in engagement with said contacts.

4. In a dimming switch, the combination of a support having contacts thereon, a switch member pivotally mounted intermediate its ends on the support and axially movable on the pivot, one end engaging the contacts, and the other end being fulcrumed on the support, and means adjacent the pivot for moving said member on the fulcrum adapted to hold the same in engagement with said contacts.

In testimony whereof we affix our signatures.

CHARLES W. McKEE.
WILLARD T. TAGGART.